(12) United States Patent
Buschle et al.

(10) Patent No.: US 12,462,433 B2
(45) Date of Patent: Nov. 4, 2025

(54) MEASURING DEVICE AND MEASURING METHOD FOR CHECKING A MEASURED-IMAGE STATE

(71) Applicant: KARL STORZ SE & Co. KG, Tuttlingen (DE)

(72) Inventors: Lukas Buschle, Tuttlingen (DE); Simon Haag, Tuttlingen (DE); Jasmin Keuser, Tuttlingen (DE)

(73) Assignee: KARL STORZ SE & Co. KG, Tuttlingen (DE)

( * ) Notice: Subject to any disclaimer, the term of this patent is extended or adjusted under 35 U.S.C. 154(b) by 0 days.

(21) Appl. No.: 18/832,581

(22) PCT Filed: Jan. 23, 2023

(86) PCT No.: PCT/EP2023/051511
§ 371 (c)(1),
(2) Date: Jul. 24, 2024

(87) PCT Pub. No.: WO2023/139251
PCT Pub. Date: Jul. 27, 2023

(65) Prior Publication Data
US 2025/0104281 A1    Mar. 27, 2025

(30) Foreign Application Priority Data

Jan. 24, 2022 (DE) ..................... 10 2022 101 527.0

(51) Int. Cl.
*G06T 7/593* (2017.01)
*G06T 7/80* (2017.01)
*G08B 21/18* (2006.01)

(52) U.S. Cl.
CPC ................ *G06T 7/85* (2017.01); *G06T 7/593* (2017.01); *G08B 21/182* (2013.01);
(Continued)

(58) Field of Classification Search
CPC ........... G06K 19/0701; G06K 19/0702; G06K 19/0723; G06T 2207/10012;
(Continued)

(56) References Cited

U.S. PATENT DOCUMENTS 7,048,685 B2   5/2006  Sakiyama
10,523,911 B2  12/2019 Takenouchi et al.
(Continued)

FOREIGN PATENT DOCUMENTS

CN    112734858 A    4/2021
DE     10100335 B4   2/2017
(Continued)

OTHER PUBLICATIONS

International Search Report, Application No. PCT/EP2023/051513, mailed May 2, 2023. ISA/European Patent Office.
(Continued)

*Primary Examiner* — Masum Billah
(74) *Attorney, Agent, or Firm* — Honigman LLP (57) ABSTRACT

A measuring system for checking a measured-image state and/or a calibration quality for a stereo measured image, comprising: a first image capturing apparatus; a second image capturing apparatus spaced apart from the first image capturing apparatus; an output apparatus; and an evaluation apparatus designed to generate a stereo measured image from the at least first measured image and the at least second measured image by way of stereo reconstruction; wherein the evaluation apparatus is designed to check a measured-image state and/or to check the calibration quality of the stereo measured image and, should the at least one capturing defect overshoot or undershoot a predetermined threshold value, to transmit a first alert to the output device, and/or,
(Continued)

should the calibration quality overshoot or undershoot a predetermined quality limit value, to transmit a second alert to the output device.

15 Claims, 5 Drawing Sheets

(52) U.S. Cl.
CPC ............... *G06T 2207/10012* (2013.01); *G06T 2207/10021* (2013.01); *G06T 2207/10056* (2013.01); *G06T 2207/10068* (2013.01); *G06T 2207/30208* (2013.01)

(58) Field of Classification Search
CPC . G06T 2207/10021; G06T 2207/10056; G06T 2207/10068; G06T 2207/30208
USPC .......................................................... 348/47
See application file for complete search history.

(56) References Cited

U.S. PATENT DOCUMENTS

| | | | |
|---|---|---|---|
| 2010/0208046 A1* | 8/2010 | Takahashi | G02B 23/2415 348/E7.085 |
| 2013/0083169 A1* | 4/2013 | Higuchi | H04N 13/25 348/47 |
| 2020/0242806 A1* | 7/2020 | Mori | H04N 13/246 |
| 2021/0211635 A1* | 7/2021 | Shapira | G02B 30/22 |
| 2022/0400938 A1 | 12/2022 | Arai | |

FOREIGN PATENT DOCUMENTS

| | | |
|---|---|---|
| DE | 102016217792 A1 | 3/2018 |
| DE | 102018125739 A1 | 5/2019 |
| EP | 3656334 A1 | 5/2020 |
| JP | 2007/167630 A | 7/2007 |
| JP | 5777317 B2 | 9/2015 |
| WO | 2005094565 A1 | 10/2005 |
| WO | 2020/041717 A1 | 2/2020 |

OTHER PUBLICATIONS

Hirschmüller, Heiko (2005), "Accurate and efficient stereo processing by semi-global matching and mutual information." IEEE Conference on Computer Vision and Pattern Recognition. pp. 807-814.
NPL_OpenCV 2.4.13.7 documentation "Camera Calibration and 3D Reconstruction", https://docs.opencv.org/2.4/modules/calib3d/doc/camera_calibration_and_3d_reconstruction.html.

* cited by examiner

MEASURING DEVICE AND MEASURING METHOD FOR CHECKING A MEASURED-IMAGE STATE

CROSS-REFERENCE TO RELATED APPLICATIONS

This application is the U.S. national stage of PCT/EP2023/051511 filed on Jan. 23, 2023, which claims priority of German Patent Application No. DE 10 2022 101 527.0 filed on Jan. 24, 2022, the contents of which are incorporated herein.

TECHNICAL FIELD

The present disclosure relates to a measuring system and a measuring method for checking a measured-image state and/or a calibration quality for a stereo measured image, in particular an endoscopic and/or exoscopic and/or microscopic and/or laryngoscopic stereo measured image, according to the respective preamble of independent claims 1 and 15.

BACKGROUND

Optical visualization systems such as microscopes, exoscopes and endoscopes make it possible to display a scene and/or a working area in which fine motor work and/or visual checks are carried out. In medical interventions, for example, the working area is an operating field in an internal region of the human body, for example inside a thorax or a head.

Exoscopy describes the observation and, if necessary, illumination of an operating field on a patient and/or an object field on any object starting from a location away from, i.e. outside, the body of the patient or away from the object.

Endoscopy describes an imaging technique with which an endoscope is inserted into a cavity. The specialist personnel carrying out such an intervention with an endoscope observe the image captured by the endoscope on the screen and can direct their actions on the basis of this image. During medical procedures, such as minimally invasive interventions, an endoscope is inserted into the body in order to capture an internal image of the body and display it on the screen. Due to the often required precise working method of the specialist personnel, it is desirable that the most accurate, high-resolution image of the cavity and/or the working area on which the check and/or operation is to be carried out is provided.

SUMMARY

The images captured by the endoscope and shown on a display device are generally two-dimensional, such that even specialist personnel are unable to precisely determine the dimensions and/or measurements of an object being observed in the scene depicted due to the lack of depth information.

However, in order to solve this problem and/or to enable depth measurements in a measured image, three-dimensional stereo endoscopes and/or stereo exoscopes and/or microscopes are also known with which a scene is recorded from two different viewing angles by two image capture units. The two image capture units, preferably synchronized per time unit and viewing angle, each capture one image of the scene to be observed.

This results in each case in so-called stereo measured image pairs with a common time stamp. Depth information can be evaluated from such a stereo measured image pair using methods of stereo reconstruction. In other words, stereo reconstruction describes the ascertainment of depth information for all or many points in a captured scene, which results in a depth map of the scene. If the focal length and stereo base (i.e., the distance between a first and a second image capturing apparatus) are known, a pixel offset between a respective pixel in the measured image captured by the first image capturing apparatus and a pixel corresponding to this pixel in a measured image captured by the second image capturing apparatus relative to one another can be used to infer a distance of this pixel or image point from the measuring device. The offset is referred to as a disparity. Objects at a great distance exhibit a small disparity, i.e. a small pixel offset, within a respective image pair during stereo capture. Objects in the foreground, on the other hand, show great disparity. This means that a type of depth map for the stereo-reconstructed stereo measured image is calculated from the disparity with knowledge of the optical parameters of the image capturing apparatus(s), which comprises, for example, pixel-by-pixel depth information of the object to be observed. Using the depth information, it is possible, for example, to determine the distance between any two pixels in Euclidean space. In the prior art, stereo reconstruction is carried out on the basis of known mathematical stereo reconstruction algorithms, for example using so-called semi-global matching algorithms (available at: Hirschmüller, Heiko (2005), "Accurate and efficient stereo processing by semi-global matching and mutual information." IEEE Conference on Computer Vision and Pattern Recognition. pp. 807-814).

In order to be able to apply such a stereo reconstruction algorithm, it is necessary to calibrate a stereo measuring device, in particular a 3D camera, in advance. Calibration corrects distortions in a measured image, for example, that would otherwise distort the disparity values to be ascertained. On the other hand, it is necessary to ascertain a relative location and/or relative position (or a translational and/or rotational offset) between the two image capturing apparatuses relative to one another as accurately as possible. To determine these calibration parameters, calibration measured images of a chessboard pattern with a precisely known chessboard field size are preferably recorded. The calibration parameters can be calculated using the open-source library OpenCV 2.4.13.7 documentation "Camera Calibration and 3D Reconstruction".

During the use of a stereo measuring device, calibration is to be carried out as rarely as possible due to the time required for this. Since a large number of settings and procedures is also to be observed when recording the calibration measured images, for example that the entire chessboard must always be comprised in the recorded calibration measured image and/or that the chessboard must be recorded from different, precisely defined angles, and/or that there must be no light reflections in the captured calibration measured image, etc., it is desirable that the calibration is only carried out by specialist personnel.

In addition, even minimal structural differences between measuring devices identical in construction can lead to poorer depth estimates and thus to a reduction in measurement quality. This requires that calibration must be carried out individually for each measuring device. Depending on the recording situation, it may also be necessary to use different image capturing apparatuses, which may have to be replaced by the user. However, it is not acceptable here for a user to undertake a recalibration after such a change, since this requires a great deal of time and expert knowledge. Furthermore, even without replacement, the calibration may no longer match the actual optical properties of the image capturing apparatus(es) after some time, for example due to mechanical impact on the image capturing apparatus(es). This leads to an emerging inaccuracy in the stereo reconstruction-based ascertainment of depth information.

Solutions that are intended to overcome at least some of the disadvantages mentioned above are already known from the prior art.

For example, US 2020/0242806 A1 and WO 2020/041717 A1 disclose the memory of calibration parameters in a measuring device, for example in a camera housing. Current calibration data or calibration parameters (e.g., a color and/or an optical distortion or aberration of a stereo endoscopic image alignment along with properties of an image sensor used) of the measuring device are captured and stored. The storage of these parameters enables the device-specific availability of these parameters, such that they can be included in every stereo reconstruction evaluation.

A stereo endoscope is also known from EP 3 656 334 A1, with which data relating to a positional relationship between a navigation tracker and one or more image sensors are stored in the stereo endoscope in order to use them in the subsequent measurement.

Further exemplary solutions are described in U.S. Pat. No. 7,048,685 B2, DE 10 2016 217792 A1, JP 2007/167630 A and U.S. Pat. No. 10,523,911 B2.

US 2022/0400938 A1 discloses a medical observation system with a plurality of sensors for measuring properties of the interior of a body. A possible impairment of one of the sensors is to be recognized, and it is to be determined which of the sensors is used for the measurement.

Although the prior art already provides some solutions, it seems necessary to inform the user more precisely about the status of the measuring device, in particular during use, in order to minimize measurement inaccuracies and/or measurement errors.

In addition, measurement errors can occur not only due to incorrect and/or inaccurate calibration of the measuring device, but also due to a variety of other external disturbance variables, such as soiling and/or clouding of a lens, etc. Making information about such disturbance variables available in the region of the measuring devices seems desirable for the user, but has so far only been realized to an insufficient extent in the prior art.

The present disclosure is therefore based on the object of improving the disadvantages known from the prior art and, in particular, proposing a measuring device and a measuring method that enable optimized status feedback of the device to a user.

The object is achieved by a measuring system with the features of independent claim 1. Furthermore, the object is achieved by a measuring method with the features of independent claim 15.

According to a first aspect, a measuring system for checking a measured-image state and/or a calibration quality for a stereo measured image, in particular an endoscopic and/or exoscopic and/or microscopic and/or laryngoscopic stereo measured image, is provided according to the disclosure. The measuring system according to the disclosure comprises a first image capturing apparatus, which is configured to capture from a first viewing angle at least one first measured image of a measurement object in a scene. Furthermore, the measuring device comprises a second image capturing apparatus spaced apart from the first image capturing device and configured to capture from a second viewing angle which differs from the first viewing angle at least one second measured image of the measurement object in the scene. The measuring device also comprises an output apparatus and an evaluation apparatus. The evaluation apparatus is designed to generate a stereo measured image from the at least first measured image and the at least second measured image by way of stereo reconstruction, with depth information being comprised in the stereo measured image for individual pixels, preferably all pixels, of the stereo measured image. The depth information for each image point or pixel is preferably to be understood as a distance of a real point of the measurement object and/or the scene represented by this pixel in the first and/or second measured image from the first and/or second image capturing device. The distance can preferably be defined by the length of a perpendicular from the stereo base to the respective real point.

The measuring device according to the disclosure is characterized in that the evaluation unit is designed to check a measured-image state of the at least first measured image and/or the at least second measured image for the presence of at least one capturing defect; and/or to check the calibration quality for the stereo measured image on the basis of calibration parameters, in particular on the basis of at least one calibration parameter, of the first and/or second image capturing apparatus; and, should the at least one, in particular measurement accuracy-reducing, capturing defect overshoot or undershoot a predetermined threshold value, to transmit a first alert to the output device, and/or, should the calibration quality overshoot or undershoot a predetermined quality limit value, to transmit a second alert to the output device, with the output device being configured to output the first and/or second alert.

According to a second aspect of the disclosure, a measuring method for checking a measured-image state and/or a calibration quality for a stereo measured image, in particular an endoscopic and/or exoscopic and/or microscopic and/or laryngoscopic stereo measured image, is provided. The method according to the disclosure comprises at least the steps listed below: Capturing from a first viewing angle at least one first measured image of a measurement object in a scene; capturing, from a second viewing angle which differs from the first viewing angle, at least one second measured image of the measurement object in the scene; and generating a stereo measured image from the at least first measured image and the at least second measured image by way of stereo reconstruction, wherein depth information is comprised in the stereo measured image for individual pixels of the stereo measured image. The method according to the disclosure is characterized by the following steps: Checking a measured-image state of the at least first measured image and/or the at least second measured image for the presence of at least one capturing defect, in particular one that reduces measurement accuracy; and/or checking the calibration quality for the stereo measured image on the basis of calibration parameters, in particular on the basis of at least one calibration parameter; and, should the at least one capturing defect overshoot or undershoot a predetermined threshold value, displaying a first alert, and/or, should the calibration quality undershoot a predetermined quality limit value, displaying a second alert.

According to the disclosure, a state or a display quality for the first and/or second captured measured image is thus preferably continuously checked to determine whether a capturing defect is present in the at least first and/or second measured image, as a result of which the in particular two-dimensional or three-dimensional capture of the measurement object by the measuring system is impaired. Such a capturing defect may not be recognized with sufficient accuracy by a user from a visual point of view, since the user is, in principle, oriented to a very restricted field of view within the scene in which he plans and/or observes and/or controls the work process, for example during an operation on the human or animal body. In this way, the user may not be able to perceive capturing defects in the edge regions of the first and/or second measured image with sufficient accuracy and, if necessary, rapidly. According to the disclosure, this is improved in that at least the first alert about the presence and/or initiation of a capturing defect is preferably continuously displayed to the user. The solution according to the disclosure is in particular relevant if the user is working in a 2D mode and, for example, a lens of the first and/or second image capturing device has contamination that the user cannot recognize with the naked eye. From a technical point of view, the accuracy of the three-dimensional stereo recording and/or stereo display of the measurement object can be improved by taking into account the capturing defect and/or the calibration quality when calculating measured values. This also avoids measurement errors in relation to the measurement object. It is also possible that the first alert comprises an action that restricts and/or deactivates one or more functions of the measuring system, for example if the value undershoots the predetermined threshold value. The selection of the threshold value is inherently related to the capturing defect being observed. For example, if the capturing defect is soiling, the threshold value can indicate the number of pixels that can still be obscured by the soiling without unreasonably impairing the capturing and measurement quality or the measured-image state. The threshold value can also be predetermined on the basis of color and/or brightness values, a contrast, a blurring or similar optical factors.

Alternatively or additionally, according to the disclosure, a quality for a match and thus also a quality for the stereo measurement between the at least first measured image and the at least second measured image can also be ascertained by including the calibration parameters. As a result, it is particularly preferably possible to check the measurement continuously in order to detect measurement deviations as early as possible. Inadequate calibration quality, predetermined by the quality limit value, can become noticeable in a deviation, for example because the calibration data no longer match a current measurement point situation, which occurs as a vertical offset when ascertaining the match between a predetermined measuring point in the first measured image and a corresponding pixel in the second measured image. However, in an ideally calibrated state, it would be advantageous that a predetermined measuring point in the first measured image and a corresponding pixel in the second measured image is offset relative to one another in the horizontal direction solely due to the distance or stereo base between the first and second image capturing apparatuses. The vertical deviation, which is also possible, can result, for example, from the fact that at least one of the first and second image capturing apparatuses has been mechanically influenced. As a result, the user receives an error-prone evaluation of the depth information for at least some of the pixels in the stereo-reconstructed stereo measured image. According to the disclosure, in order to compensate for such an error in the ascertainment of the depth information, in particular ascertained pixel-by-pixel, the calibration quality achieved during the measurement or capturing of the measurement object is preferably ascertained and preferably output to a user. When ascertaining the calibration quality, depth information ascertained by the evaluation apparatus at least for the first and/or second measured image is preferably compared with ideal depth information expected with regard to an ideally calibrated state of the measuring system. Therefore, a quality of the ascertainment of the depth information is preferably indicated. For example, the user can be shown whether and how the stereo measurement is deteriorating, in order to indicate to the user that calibration of the first and/or second image capturing apparatus is no longer sufficient.

Furthermore, according to the disclosure, it is not necessary for a user of the measuring system to first order the check of the calibration quality by manual input. Instead, the calibration quality is preferably checked continuously and/or automatically during the stereo measurement according to the disclosure. Thus, the user preferably always receives information as to whether the quality of the measurement is still sufficient or whether a recalibration of the measuring device is required.

Preferably, according to the disclosure, it is possible to check, preferably in the background on the software side, for each use of the measuring system, whether the calibration parameters are still accurate and, in particular, whether they match a current capturing situation in each case. The user can thus preferably be provided with a quality index of calibration for each use of the measuring system. This status information is preferably displayed to the user, wherein an update of the calibration parameters is recommended if necessary. Alternatively or additionally, it is also possible that, should the quality of the calibration quality be no longer sufficient, and in particular should the calibration parameters of the first and/or second image capturing apparatus deviate significantly from the actual optical properties, a measuring function of the measuring system is at least partially restricted or at least temporarily deactivated, for example, in order to avoid incorrect measurements. Preferably, the evaluation apparatus is configured to check the calibration quality continuously, particularly preferably in real time, such that the user can be provided with a status of the stereo measured image, preferably continuously and in real time.

The calibration parameters can preferably be a distortion and/or a tilt and/or other optical and/or mechanical properties of the first and/or second image capturing apparatus. Preferably, the first and second viewing angles do not change relative to one another during the operation of the measuring system or during the carrying out of the measuring method. The first and second image capturing apparatuses preferably have a predetermined distance relative to one another, in particular represented by the stereo base, and are in each case aligned with the scene to be captured or the measurement object. However, a change in the first and/or second viewing angle can undesirably result from the fact that one or more settings and/or an alignment of the first and/or second image capturing apparatus changes compared to a calibrated state, for example due to mechanical and/or thermal external influences, when the measuring system is used.

It is understood that a threshold value is predetermined for each individual capturing defect, preferably depending on the type and characteristics, such that the first and/or second measured image can be checked for the presence of a plurality of different capturing defects by the evaluation apparatus in parallel and/or successively in time. It is also understood that the output of the first and/or second alert is not limited to a haptic and/or optical and/or acoustic output.

In this way, the output of the first and/or second alert can, for example, consist of the execution of at least one predetermined control command, by means of which one or more functions of the measuring system can be at least temporarily restricted and/or deactivated. The evaluation apparatus is preferably a camera control unit (CCU). Preferably, the first and/or the second image capturing apparatus in each case comprises an imaging sensor and/or a camera. Preferably, the first and second image capturing apparatuses together form a stereo camera. Distal imaging sensors are particularly preferably used as the first and second image capturing apparatuses in the measuring system, since these enable better robustness of the calibration against mechanical and thermal influences.

According to the disclosure, the at least one stereo measured image, preferably the plurality of stereo measured images successively in time, is processed by the above-mentioned stereo reconstruction of a respective stereo image pair, for example the stereo image pair defined by the first and the second measured image, on the basis of optical and/or dimensional parameters of the image capturing device. The stereo reconstruction preferably comprises a calculation, in particular pixel-by-pixel, of depth information for pixels of the at least one stereo measured image, in order to, for example, enable a dimensional measurement between at least two measuring points selected from a recording scene. The stereo reconstruction preferably comprises a correction of distortion effects and/or a transformation in each stereo image pair (rectification). It is understood that the first and second measured images are preferably captured in a manner synchronized in time, i.e. they preferably have an identical time stamp.

Advantageous further developments of the disclosure are indicated in the dependent claims. All combinations of at least two of the features disclosed in the description, the claims and/or the figures fall within the scope of the disclosure. It is understood that exemplary embodiments and embodiments described in relation to the measuring system according to claim 1 can relate in equivalent, albeit not identical, form to the method according to claim 15, without being explicitly mentioned for the latter. It is also understood that transformations that are customary in the language and/or a meaningful replacement of respective terms in the context of customary language practice, in particular the use of synonyms supported by generally recognized language literature, are also covered by the present disclosure, without being explicitly mentioned in their respective formulation.

It is understood that the method steps according to the disclosure do not necessarily have to be carried out in the order listed, but that this order can also be changed. It is also possible that one or more intermediate steps can be carried out between one or more method steps.

According to a preferred embodiment, the calibration parameters of the first and/or second image capturing apparatus or the individual calibration data for each image capturing device are stored in the measuring device, for example in a memory unit. This has the advantage that the calibration parameters can be taken into account in the stereo evaluation of the captured measured images in an apparatus-specific manner, as a result of which the accuracy of the measuring device is increased. The memory unit is particularly preferably designed to transfer stored calibration parameters, for example after a new calibration, using new calibration parameters. According to the disclosure, it can be advantageous if the calibration parameters are preferably transmitted together with the stereo-reconstructed image data of the stereo measured image from the camera control unit (CCU) to a further documentation system, in order to be analyzed by the latter, preferably subsequently. Thus, an accurate calibration can preferably be effected both intra-operatively and retrospectively for each (stereo) measured image. Preferably, the calibration parameters for the first and second image capturing apparatuses are stored in a form that is clearly distinguishable from one another. Here, storage on two separate memory units is also possible and may be advantageous. Storage on an internal memory, an external memory and/or on a server can also be advantageous, wherein data transfer via a network is particularly preferable.

In a preferred embodiment, the first and second image capturing apparatuses are in each case configured to generate a continuous video recording of the measurement object, wherein the first and second measured images in each case define a stereo image pair captured synchronously in time as individual images of a stereo video recording. Furthermore, the evaluation apparatus is configured to continuously check the measured-image state and/or the calibration quality during the stereo video recording. Particularly preferably, the output device is configured to output the measured-image state in the form of the first alert and/or the calibration quality in the form of the second alert, in particular continuously. The output can, for example, be effected as a graphical overlay in the graphical representation of the stereo video recording of the scene or of the at least one measurement object.

In other words, the at least one stereo measured image is preferably an individual stereo measured image of a plurality of stereo measured images successively in time, which in each case is composed of a measured image pair and which, when arranged in sequence, result in a video recording of the at least one measurement object or the scene. A time interval between the individual stereo measured images is preferably determined by a predetermined frame rate. It is understood that the stereo measured image can, in principle, be any individual stereo measured image of such a video recording and/or video sequence and of course does not have to be limited to an initially captured image. In particular, the first and second measured images are in each case individual images of video recordings made of the measurement object by the first and second image capturing apparatuses, preferably in a manner synchronized in time. In each case, two measured images with the same time stamp preferably define a stereo measured image pair from which a stereo measured image can be ascertained or formed.

In a further preferred embodiment, the stereo reconstruction comprises a correction of distortion effects and/or a rectification in the at least first and the at least second measured image and/or a pixel-by-pixel, in particular algorithmic, evaluation of depth information of the scene and/or the at least one measurement object, in particular in geometric relation to the first and/or second image capturing apparatus. Preferably, the algorithmic evaluation can be effected on the basis of a semi-global matching algorithm with the first and second measured image. Other known methods of stereo reconstruction that are used to ascertain depth information from a stereo image pair are also comprised here, without being explicitly mentioned.

In a further preferred embodiment, the at least one capturing defect describes an at least partial soiling and/or smearing and/or at least partial fogging of a lens or a distal window of the first image capturing apparatus and/or a lens or a distal window or cover glass of the second image capturing apparatus. A cover glass of this type seals the medical instrument in a vapor-tight manner, for example, such that moisture cannot penetrate the optics during cleaning. Alternatively or additionally, the at least one capturing defect describes a presence of a smoke gas in the scene and/or an overexposure or underexposure of the scene and/or an insufficient depth of sharpness of the first image capturing apparatus and/or the second image capturing apparatus for capturing the at least one measurement object in the scene. Alternatively or additionally, the at least one capturing defect describes an insufficient light and/or color ratio in the scene.

In other words, according to the disclosure, it can be checked, by way of example, whether one or both lenses or windows of the first and second image capturing apparatus are contaminated, and as a result of which the quality or accuracy of the depth map ascertained on the basis of the stereo reconstruction are reduced. According to the disclosure, the evaluation apparatus is preferably designed to check and/or classify at least the first and second measured images, preferably a plurality of recorded first and second measured images in each case, independently of one another by applying an algorithm with regard to a possibly existing contamination, in particular of at least one lens or window. As a result of this check, the evaluation apparatus can ascertain whether at least one lens is contaminated. If one or both lenses or windows are dirty, the first alert appears in a display menu of the output apparatus, for example, which can be used to restrict and/or deactivate at least one measuring function if necessary.

It is understood that the evaluation apparatus can also be configured to check the measured images for the presence of a plurality of capturing defects in any combination, preferably simultaneously. Here, for example, training images could be manually sorted and/or classified into the above capturing defects. A neural network can preferably be trained on the basis of these training images, so-called multiclass classification.

In a further preferred embodiment, the evaluation apparatus is configured to check the first and/or second measured image for the presence of the at least one capturing defect by forming an average value of the at least one capturing defect over at least one predetermined image segment in the first and/or second measured image. In other words, it is preferably possible that the evaluation apparatus is designed to evaluate the first and/or second measured image segment-by-segment for the presence of a capturing defect, in order to enable exact localization of the capturing defect. This gives the user the option of remedying the capturing defect through corresponding interaction on the basis of the ascertained image segment. For example, the user can activate a fluid nozzle, which is consequently configured to direct a jet of compressed air or water onto a part of the lens or window that corresponds in the first and/or second measured image to the image segment in which the capturing defect, for example a contamination, was ascertained.

In a further preferred embodiment, the evaluation apparatus is configured to compare the first and second measured images with one another at least segment-by-segment with respect to the presence of the at least one capturing defect. Such a comparison, at least between the first and second measured images, is advantageous, since, on the one hand, it allows for a plausibility check. On the other hand, this comparison can improve the localization of a capturing defect in the scene or indirectly on at least one lens or window of the first and/or second image capturing apparatus.

In a further preferred embodiment, the evaluation apparatus is configured to carry out the check of the first and/or second measured image for the presence of the at least one capturing defect on the basis of artificial intelligence and/or on the basis of an algorithmic evaluation of image data of the first and/or second measured image. A computer vision algorithm, for example when using a Laplace filter, can be used in a check of an image sharpness of the first and/or second measured image. The algorithm that is used to evaluate the capturing defects can, for example, be an algorithm through which an evaluation of the contrast ratios in the first and second measured images is effected. Alternatively or additionally, it is possible that the algorithm comprises a classifier on the basis of artificial intelligence. All known methods of artificial intelligence, in particular machine learning, assisted learning, etc., can be used here.

In a further preferred embodiment, the evaluation apparatus is configured to check, by evaluating the depth information, the first measured images successively in time and/or the second measured images successively in time of the stereo video recording of the at least one measurement object, whether the first and/or second image capturing apparatus is maintaining a predetermined safety distance from the at least one measurement object. In other words, an examination of a measuring system, in particular a stereo video camera, moving relative to the measurement object can be effected. During this examination, it is preferably checked whether a part of the measuring system, for example a lens or a window of the first and/or second image capturing apparatus, is too close to the measurement object. In particular, it can be checked whether the depth information for an observed measuring point on the measurement object decreases continuously as the first and/or second image capturing apparatus approaches. The evaluation apparatus can, for example, be designed to recognize whether the first and/or second measured image and/or image segments contained therein become blurred during the approach. If, for example, a predetermined sharpness limit value is overshot or undershot, the evaluation apparatus can preferably instruct the output apparatus to output a warning to the user in the form of the first warning signal. This embodiment is particularly suitable for robotic applications of the measuring system, with which, for example, a movement of at least part of the measuring system relative to the measurement object is guided and controlled by at least one robot. If, in such a case, it is recognized according to the disclosure that a part of the measuring system no longer maintains the predetermined safety distance from the measurement object, the robot movement of at least the part of the measuring system can be aborted at least semi-automatically and/or changed at least with regard to one direction of movement. Thus, a collision with the measurement object can be effectively prevented, which is particularly advantageous in medical operation applications. In addition, if the measuring system is too close to the measurement object, this can make it difficult to determine the depth map if the measured images (for example, the first and second measured images) cannot be displayed sharply.

In a preferred embodiment, the evaluation apparatus is configured to check the plausibility of the depth information ascertained from the first and second measured images, preferably pixel-by-pixel, on the basis of the calibration parameters of the first and/or second image capturing apparatus. Here, in particular, there is a check of whether there is a vertical offset mentioned above between a measuring point in relation to the first measured image and a measuring point corresponding to it in the second measured image, and whether this vertical offset overshoots a predetermined quality limit value, preferably determined in pixels (ptx). If the predetermined quality limit value, which preferably determines the vertical offset, is overshot, the accuracy of the measurement is no longer sufficient and a recalibration of the measuring system is required as soon as possible or immediately.

In a preferred embodiment, the evaluation unit is configured to compare, during the plausibility check, the depth information ascertained from the first and second measured images, preferably pixel-by-pixel, with depth information that is to be expected in an ideally calibrated state of the first and/or second image capturing apparatus on the basis of the calibration parameters of the first and/or second image capturing apparatus. Based on this plausibility check, the calibration quality for the stereo-reconstructed stereo measured image can preferably be ascertained. If, for example, a vertical offset is detected between the pixel-based representation of a measuring point in the first and second measured images in relation to the measurement object, it can be concluded that the calibration quality has decreased with regard to an initial calibration. If such an offset overshoots the predetermined quality limit value or threshold value, the second alert is transmitted to the output apparatus.

In a preferred embodiment, the evaluation apparatus is configured to include the ascertained calibration quality in a display of at least one measurement result that is to be displayed in relation to the at least one measurement object. Thus, it is possible to correct a measurement error that occurs due to insufficient calibration quality, at least in the display of a related measurement result. Such a correction can be effected, for example, until the predetermined quality limit value is overshot. Thus, for example, a vertical pixel offset between a measuring point in the first measured image and a corresponding pixel in the second measured image, which is caused by insufficient calibration quality, can be corrected, at least with regard to a display to a user.

In a preferred embodiment, the output of the first and/or second alert comprises at least that at least one predetermined operating function of the measuring system is at least temporarily deactivated; and/or that an indication is effected that at least one predetermined operating function of the measuring system is at least temporarily deactivated; and/or that an indication is effected as to which type of capturing defect is present in which image segment of the first and/or second measured image; and/or that an indication is effected of how a user can remedy the ascertained capturing defect; and/or that an indication is effected of the extent to which the calibration quality for the first and/or second measured image deviates from an ideal state; and/or that an indication is effected that a calibration of the first and/or second image capturing apparatus is to be effected. The examples stated above for the output of the first and/or second alert are merely of an exemplary nature and are not to be understood as restrictive. In particular, the first and/or second alert can also be output in any other form, without departing from the scope of the present disclosure. Preferably, the first and/or second alert is output to a user continuously, particularly preferably in real time.

In a preferred embodiment, the output apparatus is designed to output the first and/or second alert in optical and/or acoustic and/or haptic form. Another type of output, for example as a control command that controls one or more functions of the measuring system, is also possible.

In a preferred embodiment, the measuring device is comprised in a stereo endoscope and/or in a stereo exoscope and/or in a stereo microscope and/or in a laryngoscope.

Preferably, the measuring device is designed as a stereo endoscope and/or a stereo exoscope and/or a stereo microscope and/or a laryngoscope.

In a preferred embodiment, the output apparatus comprises a screen and/or glasses or 3D glasses or augmented reality glasses.

Further advantages and details of the disclosure can be seen from the following description of preferred embodiments of the disclosure and from merely schematic drawings.

BRIEF DESCRIPTION OF DRAWINGS

Identical elements or elements with the same function are marked with the same reference numbers in the figures.

DETAILED DESCRIPTION OF PREFERRED EMBODIMENTS

Figure 1:
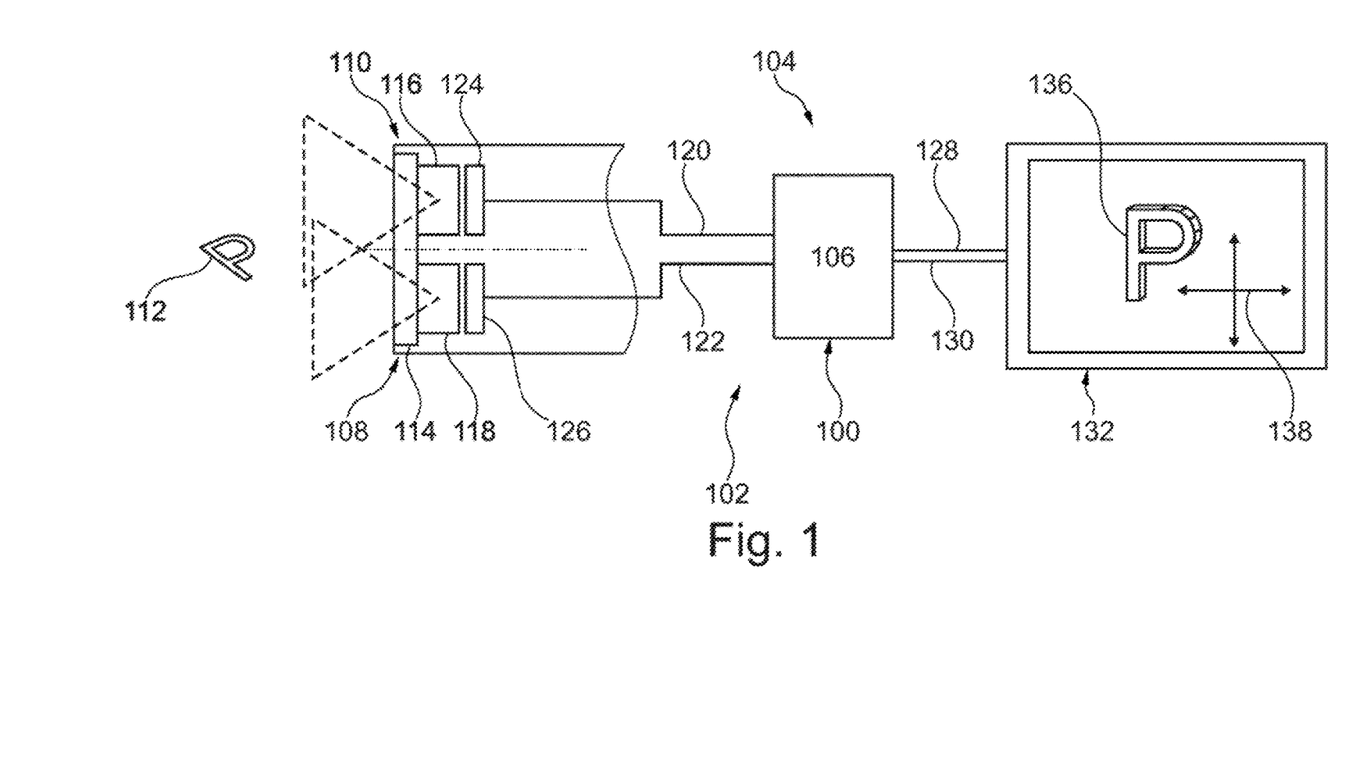
FIG. 1: is a schematic view of an exemplary embodiment of a measuring device according to the disclosure.

FIG. 1 shows a schematically simplified block diagram of an exemplary configuration of a measuring system 100. In the present case, the measuring system 100 is designed as a stereo endoscope 102. The measuring system 100 has an image capturing device 104 with an evaluation apparatus or a camera control unit (CCU) 106. Further, the image capturing device 104 comprises a first image capturing apparatus 108 and a second image capturing apparatus 110. Preferably, the image capturing device 104 comprises a memory (not shown in detail), which is at least arranged to store the calibration parameters or calibration data of the first and/or second image capturing apparatus 108, 110. It is understood that such a memory can also be arranged outside the image capturing device 104.

The first image capturing apparatus 108 has a predetermined distance from the second image capturing apparatus 110, which defines a stereo base of the stereo endoscope 102. The first and second image capturing apparatuses 108, 110 are preferably in each case a camera. The evaluation apparatus 106 is preferably configured to receive image data from the first and second image capturing apparatuses 108, 110 in the form of measured images, in the present case for example in the form of at least one first measured image 109 and at least one second measured image 111. Particularly preferably, the evaluation apparatus 106 has at least one processor for image processing, which is not shown in detail. It is understood that in other embodiments, the evaluation apparatus 106 can preferably be arranged outside the image capturing device 104. The evaluation apparatus 106 is preferably designed as a so-called camera control unit (CCU). Preferably, preprocessing of the captured measured images 109, 111 can take place in the image capturing apparatus 108, 110.

An objective lens assembly 114 is positioned upstream of the first and second image capturing apparatuses 108, 110. The objective lens assembly 114 comprises by way of example a cover glass, such as a lens, and optical units 116, 118 having apertures allocated to image capturing apparatuses 108, 110. The optical units 116, 118 define the respective field of view of the image capture units 108, 110. Each of the two image capture units 108, 110 is allocated to an observation channel 120, 122. The observation channels 120, 122 are in each case designed to transmit the measured images 109, 111 to the evaluation apparatus 106 in the form of signal-shaped image information. A signal converter 124, 126 is allocated to each of the image capturing apparatuses 108, 110 to provide the image information. The signal converters 124, 126 are in each case configured to convert the optically captured measured images 109, 111 into image information. By way of example, the signal converters 124, 126 are photochips.

The first image capturing apparatus 108 is configured to capture at least the first measured image 109 of a measurement object 112 in a scene. The measurement object 112 is shown here by way of example as a letter P. However, the measurement object 112 is usually preferably a human or animal organ or another part of a human or animal body or a component. The first image capturing apparatus 108 captures the at least first measured image 109 of the measurement object 112 preferably from a first viewing angle.

The second image capturing apparatus 110 is configured to capture at least the second measured image 111 of the measurement object 112. The first and second image capturing apparatuses 108, 110 are in each case configured to capture the first and second measured images 109, 111, preferably in a manner synchronized in time. A first and second measured image 109, 111 captured in this way forms a stereo image pair.

The evaluation apparatus 106 is designed to ascertain stereo measured image information from the stereo image pair or from the signal-based image information of the first and second measured images 109, 111 by known methods of stereo reconstruction. In the stereo measured image information, depth information is available for each captured pixel of the measurement object 112, which can be used, for example, to calculate a distance between two measuring points on the measurement object 112 in Euclidean space.

The stereo measured image information can preferably be transmitted via a first and/or a second output channel 128, 130 to an output device 132, by which the stereo measured image information is provided to a user as a stereo measured image and preferably displayed graphically. The output device 132 can be a display, for example. On the output device 132, the measurement object 112 is depicted in the form of an observation object 136. Using an input device (not shown), a user can preferably displace a cursor 138 relative to the observation object 136 or to the virtualized measurement object 112, for example, to determine a measuring point in relation to the measurement object.

It is understood that the measuring system 100 is configured to, in principle, capture a plurality of measured images of the measurement object 112 and thus to capture or provide a plurality of stereo measured images for each stereo measured image pair. Particularly preferably, it is possible with the measuring system 100 to record a (live) video of the measurement object 112, which is composed of a plurality of individual image pairs that are captured in succession at a predefined time interval, determined by the frame rate, measured in frames per second (fps).

Figure 2:
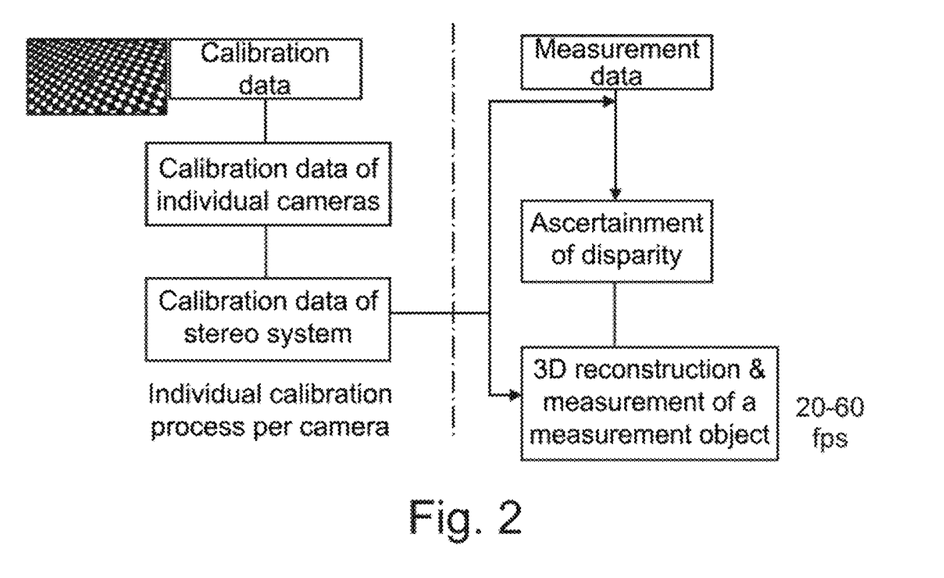
FIG. 2: is a first flow chart for representing an exemplary calibration process of a measuring system.
Figure 3:
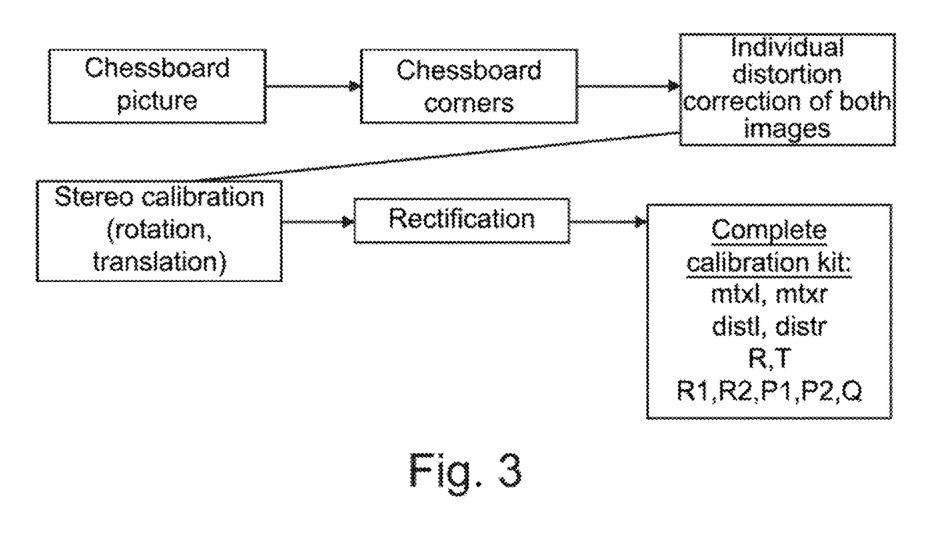
FIG. 3: is a second flow chart for representing an exemplary calibration process of a measuring system.

FIGS. 2 and 3 show exemplary flow charts or workflows of a calibration method, which is explained in more detail below. During the production of a measuring system 100 according to the disclosure or an exemplary stereo endoscope, calibration images of a chessboard pattern 140 (shown by way of example in FIG. 6) with three points for recognizing a respective (field) center point are recorded for calibration (see top left in the flow chart). Chessboard corners are then identified on these calibration images and used for further calculation of the calibration parameters. The calibration parameters typically comprise distortion correction parameters for both image capturing apparatuses or cameras, focal lengths, as well as a center point of an optical axis of the respective image capturing apparatus 108, 110. In addition, a rotation matrix and a translation vector of the two image capturing apparatuses 108, 110 relative to one another is determined. For this purpose, it is advantageous to know the precise size of a chessboard square (in advance).

Figure 6:
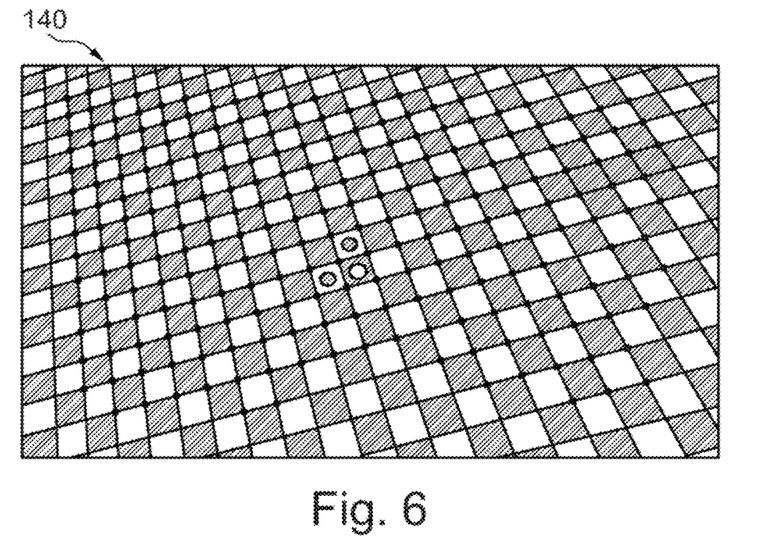
FIG. 6: is a schematic representation of a chessboard pattern used to calibrate the measuring system.

When recording such a chessboard 140, it should be noted that a plurality of calibration images are recorded from different viewing angles by the first and second image capturing apparatuses 108, 110. Calibration is preferably effected separately for the first and second image capturing apparatuses 108, 110. It is particularly advantageous that calibration images are recorded from "oblique" viewing angles. It is also important to ensure that the white chessboard surfaces are not overexposed and that the chessboard 140 is illuminated as homogeneously as possible during calibration. The chessboard 140 can preferably exist in real life or alternatively be displayed on a screen.

The calibration parameters are preferably used to transform the recorded calibration images of the first and second image capturing apparatuses 108, 110 (often referred to as right and left cameras). For this purpose, distortion effects are first corrected in the calibration images (so-called undistortion). Furthermore, the calibration images are transformed as if they had been recorded by a parallel camera system (so-called rectification). In mathematical terms, this is implemented by the so-called semi-global matching (SGM) algorithm, which is used to search for a matching pixel in a measured image captured by the first image capturing apparatus 108 for a given pixel in a measured image captured by the second image capturing apparatus 110. The algorithm preferably merely searches along the same horizontal line, since this is predetermined by the epipolar geometry.

It is also possible to convert the disparity of the chessboard corners in the calibration images into depth information and to calculate a distance between two chessboard corners on the basis of the disparity and compare this with an actual physical distance between the chessboard corners. On the other hand, it is checked whether chessboard corners have the same vertical depth value or pixel value with regard to the two image capturing apparatuses. It can also be checked whether chessboard corners that are located on the same row or column of the chessboard 140 actually lie on a common straight line in the captured calibration images and thus whether an accurate distortion correction has been effected.

If optical components of the first and/or second image capturing apparatus 108, 110 change over time, the calibration no longer correctly describes the properties of the first and/or second image capturing apparatus 108, 110 and the process of distortion correction and rectification results in identical objects being depicted on different horizontal lines, as a result of which a correct depth determination by means of the SGM algorithm is made difficult and/or impossible. In FIG. 6, for example, calibration images of a 3D chessboard image were recorded, corrected for distortion and rectified. In FIG. 6, the vertical offset is indicated in pixels. The average vertical offset is 0.4 pixels by way of example, such that the calibration can be assumed to be very good.

This problem is solved by the measuring system according to the disclosure, since the quality for the calibration or the quality for a captured measured image is checked continuously and preferably in real time against a calibration image.

According to the disclosure, an evaluation or check of the calibration quality is preferably effected in parallel with the ongoing use of the measuring system 100. According to the disclosure, the evaluation apparatus 106 is designed to check a measured-image state of the at least first measured image 109 and/or the at least second measured image 111 for the presence of at least one capturing defect and to check the calibration quality for the stereo measured image on the basis of calibration parameters of the first and/or second image capturing apparatus 108, 110.

When checking the calibration quality, the quality of the rectification in particular is evaluated, which, as described above, has a major influence on the correctness of the depth maps ascertained by the stereo reconstruction. For a given 3D stereo measured image in the associated first measured image 109, a search is made for points 142 (see FIGS. 4 and 5) that are as easy as possible to track optically (i.e., are located, for example, at a high-contrast point in the first measured image 109). The open-source library openCV cv2.goodFeaturesToTrack offers a possibility for mathematical-optical tracking.

Figure 4:
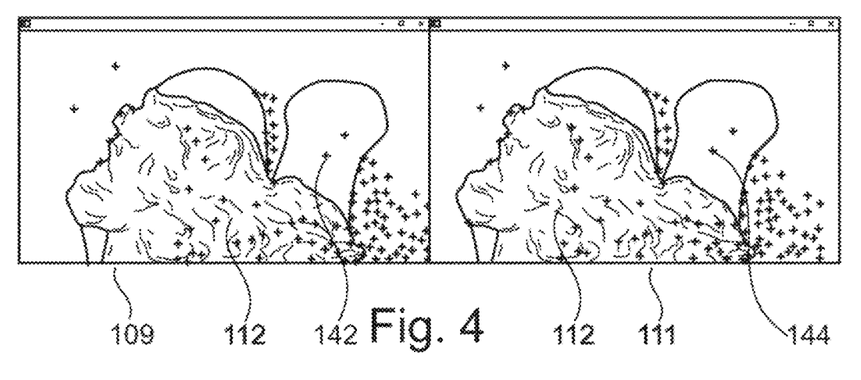
FIG. 4: is an exemplary, pictorial representation of measuring points on a measurement object with a good calibration quality.
Figure 5:
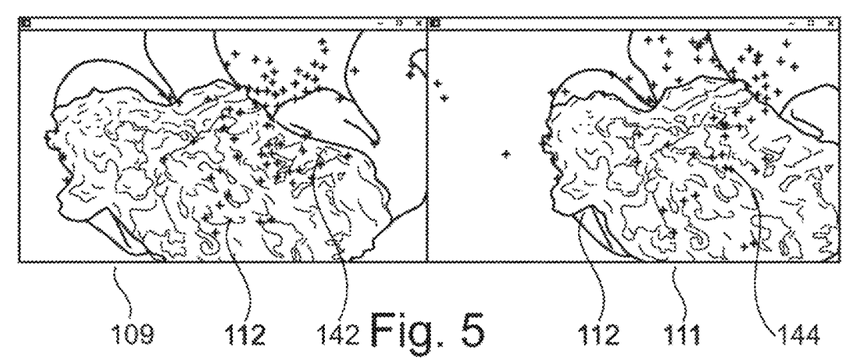
FIG. 5: is an exemplary, pictorial representation of measuring points on a measurement object with a poor calibration quality.

These points 142 are searched for as homogeneously as possible across the first measured image 109 or within the entire scene. Using an opticalFlow algorithm, e.g. openCV cv2.calcOpticalFlowPyrLK, these points 142 are transferred to the second measured image 111. The vertical offset can be calculated from these pairs of points using mathematical methods.

For an ideal calibration, this offset is zero as described above. Due to errors in optical flow calculation, it may be advisable not to consider calculated offset values of, for example, less than 10 pixels (px) as critical to quality. It can also be advantageous to calculate an average offset error over a plurality of vertical offset values and to average this calculated offset error over time, preferably over a plurality of first and second measured images successively in time.

A quality limit value can be indicated on the user and/or software side at which an acceptable calibration can still be assumed. If the calculated and, if necessary, time-averaged average offset error is 5 pixels or higher, for example, this can indicate the quality limit value above which the user is given a second alert on the output apparatus 132, for example, that recalibration is required. In the course of this, some functions of the measuring system 100 can also be deactivated, at least temporarily.

In FIG. 4, the first and second measured images 109, 111, recorded by the first image capturing apparatus 108 and the second image capturing apparatus 110, respectively, are shown side by side. Both measured images 109, 111 show the measurement object 112, in the present case a human organ, against a bright background. The background together with the measurement object 112 defines the scene. The first measured image 109 is shown on the left-hand side. The second measured image 111 is shown on the right-hand side. In the first measured image 109, as described above, a plurality of points 142 were selected to be used to calculate the vertical offset or calibration quality. These points 142 (so-called tracking points) are transferred to the second measured image by optical flow methods, i.e. pixels 144 corresponding to the points 142 of the first measured image 109 in each case are searched for in the second measured image 111. As a result, the calibration quality is an average vertical offset between the points 142 and the respective corresponding image points 144 (without taking statistical outliers into account) of 0.9 pixels, such that the calibration quality for these two measured images 109, 111 and thus of the stereo-reconstructed stereo measured image from them is very good.

FIG. 5 shows, similar to FIG. 4, a comparison of the first and second measured images 109, 111. However, in the case of FIG. 5, an incorrect calibration was intentionally used, in the present case a calibration of a different image capturing apparatus. The average vertical offset increases significantly as a result and is 5.4 pixels on average, such that the user can be warned of the poor calibration by means of the second warning signal. In this case, the predetermined quality limit value is therefore overshot.

According to the disclosure, the evaluation apparatus 106 is designed to check a measured-image state of the at least first measured image 109 and/or the at least second measured image 111 for the presence of at least one capturing defect. Various examples of such capturing defects that can occur during intended use of the measuring system are illustrated in FIG. 7 to 10. Here, a comparison of the first and second measured images 109, 110 is always shown. In addition, a superimposed depth map is always shown in the figures, which was ascertained from the first and second measured images 109, 110 in the form of the stereo measured image via stereo reconstruction.

Figure 7:
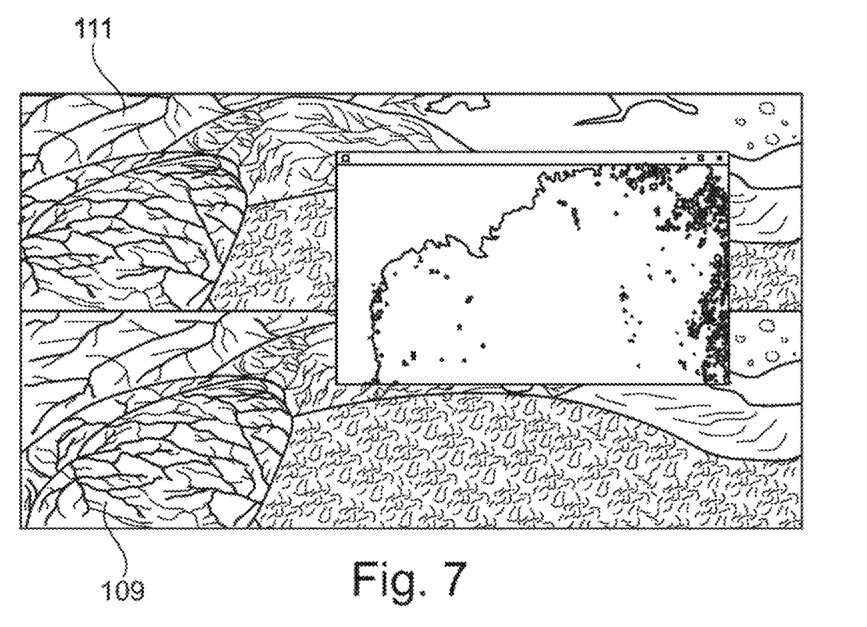
FIG. 7: is a pictorial comparison of two interference-free measured images.

FIG. 7 shows both the first measured image 109 and the second measured image 111 in each case in an interference-free state, i.e. without a capturing defect having been ascertained in the first and/or second measured image 109, 111.

Figure 8:
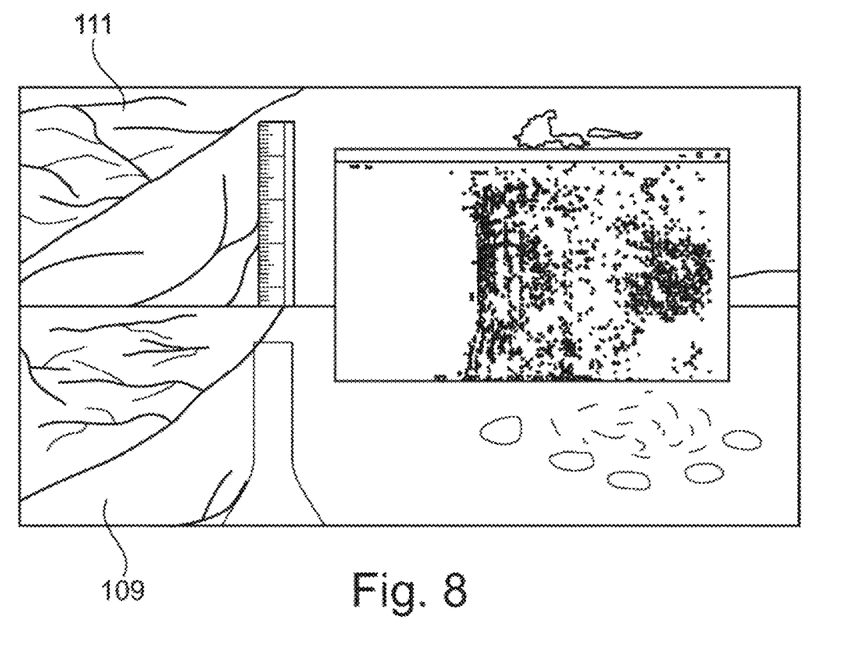
FIG. 8: is a pictorial comparison of an interference-free measured image and a measured image affected by a capturing defect.

According to FIG. 8, the second measured image (lower image) is blurred due to soiling of the lens of the second image capturing apparatus 110. Thus, an accurate depth map cannot be ascertained from the resulting stereo image pair. This is preferably indicated to the user by the first alert. Parallel to the stereo reconstruction for ascertaining the depth map and/or the stereo measured image, which is used for measuring between different measuring points, it is checked according to the disclosure whether one or both lenses of the first or second image capturing apparatus 108, 110 are contaminated, and as a result of which the quality of the depth map decreases beyond an extent that can be indicated by a threshold value. For this purpose, both measured images 109, 111 are classified independently of one another by the evaluation apparatus 106 using an algorithm, for example for dirty lenses. This algorithm can be either an AI-based classifier or a conventional algorithm that recognizes, for example, the contrast ratios in the respective measured image 109, 111. If one (or both) lenses are dirty, the first alert appears in the menu, preferably in graphic overlay, which can, if necessary, also deactivate individual measuring functions of the measuring system. Similarly, it is also possible that the first and/or second measured image 109, 111 are checked for smoke in the measured image and/or for fogging of the image capturing apparatus(es) 108, 110.

Figure 9:
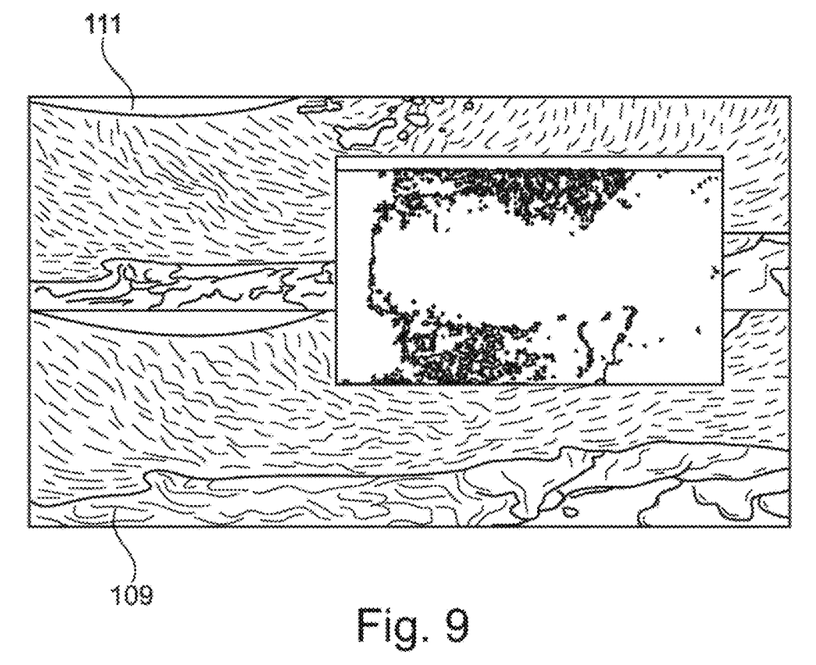
FIG. 9: is a pictorial comparison of an interference-free measured image and a measured image affected by a second capturing defect.

FIG. 9 shows a comparison of the first and second measured images 109, 111, with which an error-prone depth map is stereo-reconstructed based on overexposure of the first measured image 109. Image regions that are overexposed or underexposed cannot be correctly assigned to corresponding image regions or pixels in another measured image using standard stereo reconstruction algorithms. According to the disclosure, a check of the first and second measured images 109, 111 can preferably be effected for dark or bright image regions in real time. This can be implemented by the simple formation of limit values. Regions that have been recognized as too dark or too light can either not be selected for the selection of points or measuring points 142. Alternatively or additionally, the first alert can be output that at least one region in the first and/or second measured image 109, 111 is overexposed and/or underexposed.

Figure 10:
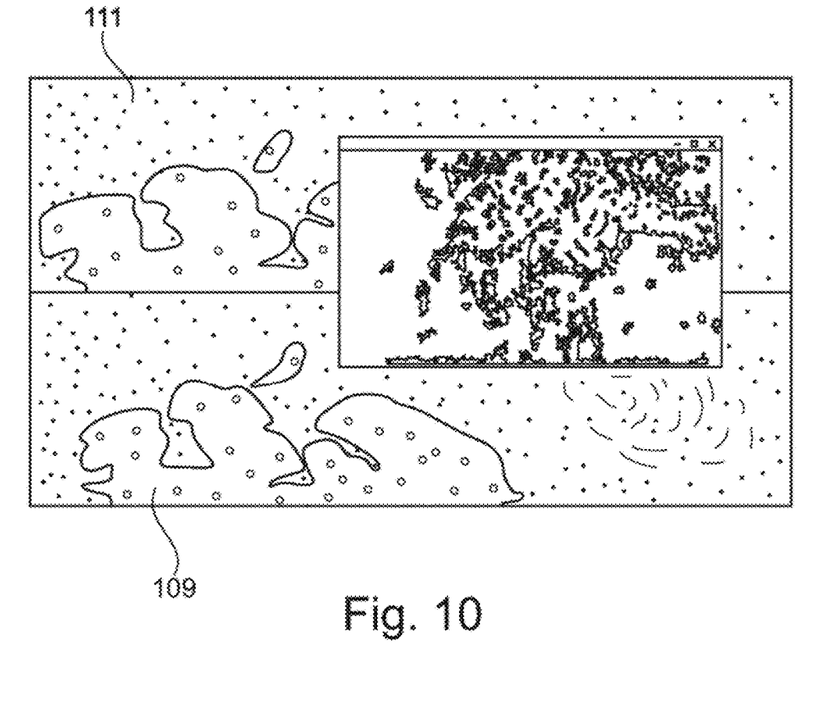
FIG. 10: is a pictorial comparison of an interference-free measured image and a measured image affected by a third capturing defect.

FIG. 10 shows a comparison of the first and second measured images 109, 111, with which an incorrect depth map was ascertained due to blurring resulting from the image capturing apparatuses 108, 110 being too close to the measurement object 112. In FIG. 10, the blurring is shown schematically as a dot pattern. In contrast to FIG. 9 in particular, a surface structure of a fabric material cannot be resolved due to the blurring shown here.

Parallel to the stereo reconstruction, it can be checked whether the two measured images 109, 111 are blurred. Blurring occurs primarily if the image capturing apparatuses 108, 110 are positioned outside the focus region or if the image capturing apparatuses 108, 110 are moved too rapidly. The sharpness of a measured image can be examined using conventional computer vision algorithms (e.g., a Laplace filter). If necessary, it is possible to differentiate between blurring due to movement and incorrect distance. This can be implemented by using optical flow algorithms. If a blurred measured image is recognized, the user can preferably be shown the first alert that the measurement is inaccurate because the stereo camera has been positioned incorrectly and/or is too close to the measurement object 112.

In addition to recognizing blurring caused by a distance of the measuring system that is too close, in particular the stereo camera formed by the first and second image capturing apparatuses 108, 110, it is possible to predict a distance that is too close. In this way, the depth map can be continuously calculated to check whether the camera is approaching the measurement object 112. If the distance undershoots a value at which the distance can still be calculated but the image is already slightly blurred, a corresponding alert can be output to the user. This is in particular relevant in robotic applications, if a robot executes the movement of the camera and can break off as a result, if necessary.

During the calculation of distances from the depth map, an average value and an associated error are calculated from the time sequence of measuring distances and displayed to the user. The indication that measured values are inaccurate can be supported by the detection algorithms according to the disclosure in that the cause of the measurement inaccuracy, i.e. the type of capturing defect, is displayed. Accordingly, it is advantageous to link the indication of the cause of a capturing defect to the overshooting of a predetermined threshold value.

According to the disclosure, it is also advantageous that a check of an exposure control of the measuring system and/or a white balance is effected, if necessary together with an adjustment of an exposure control.

In general, stereo endoscopes generate two measured images or series of measured images, which are not necessarily recorded under the same exposure settings and/or white balance conditions. Depending on the stereo reconstruction algorithm, differently recorded images can lead to errors in the depth map. Accordingly, according to the disclosure, it is checked in parallel with the stereo reconstruction whether a brightness and/or color in the first and second measured images 109, 111 is similar to one another. For example, an average value per color channel can be determined for both measured images 109, 111 and compared in each case. This can preferably also be done segment-by-segment and/or portion-by-portion. If the average values thus formed differ by more than a predetermined threshold value, it is likely that different recording conditions are present, and the user can be notified by the first alert that a white balance is required. Here, the color values and exposure control can be matched to one another again.

The invention claimed is:

1. A measuring system for checking a measured-image state and/or a calibration quality for a stereo measured image, comprising:
a first image capturing apparatus configured to capture from a first viewing angle at least one first measured image of a measurement object in a scene;
a second image capturing apparatus spaced apart from the first image capturing apparatus and configured to capture from a second viewing angle which differs from the first viewing angle at least one second measured image of the measurement object in the scene;
an output apparatus; and
an evaluation apparatus designed to generate a stereo measured image from the at least first measured image and the at least second measured image by way of stereo reconstruction, with depth information being comprised in the stereo measured image for individual pixels of the stereo measured image;
characterized in that the evaluation apparatus is designed to check a measured-image state of the at least first measured image and/or the at least second measured image for the presence of at least one capturing defect; and/or to check the calibration quality for the stereo measured image on the basis of calibration parameters of the first and/or second image capturing apparatus; and
should the at least one capturing defect overshoot or undershoot a predetermined threshold value, to transmit a first alert to the output device, and/or, should the calibration quality overshoot or undershoot a predetermined quality limit value, to transmit a second alert to the output device, with the output device being configured to output the first and/or second alert.

2. The measuring system according to claim 1, characterized in that the first and second image capturing apparatuses are in each case configured to generate a continuous stereo video recording of the measurement object, wherein the first and second measured images in each case define a stereo image pair captured synchronously in time as individual images of the stereo video recording, and in that the evaluation apparatus is configured to check the measured-image state and/or the calibration quality, in particular continuously, during the stereo video recording.

3. The measuring system according to claim 1, characterized in that the stereo reconstruction comprises a correction of distortion effects and/or a rectification between the at least first and the at least second measured image and/or a pixel-by-pixel, in particular algorithmic, evaluation of depth information.

4. The measuring system according to claim 1, characterized in that the at least one capturing defect describes an at least partial soiling and/or smearing and/or an at least partial fogging of a lens of the first image capturing apparatus and/or a lens of the second image capturing apparatus; and/or a presence of a smoke gas in the scene and/or an overexposure or underexposure of the scene and/or an insufficient depth of sharpness of the first image capturing apparatus and/or the second image capturing apparatus for capturing the at least one measurement object in the scene; and/or an insufficient light and/or color ratio in the scene.

5. The measuring system according to claim 1, characterized in that the evaluation apparatus is configured to check the first and/or second measured image for the presence of the at least one capturing defect by forming an average value of the at least one capturing defect over at least one predetermined image segment in the first and/or second measured image.

6. The measuring system according to claim 1, characterized in that the evaluation apparatus is configured to compare the first and/or second measured image with one another at least segment-by-segment with respect to the presence of the at least one capturing defect.

7. The measuring system according to claim 1, characterized in that the evaluation apparatus is configured to carry out the check of the first and/or second measured image for the presence of the at least one capturing defect on the basis of artificial intelligence and/or on the basis of an algorithmic evaluation of image data of the first and/or second measured image.

8. The measuring system according to claim 2, characterized in that the evaluation apparatus is configured to check, by evaluating the depth information, the first measured images successively in time and/or the second measured images successively in time of the stereo video recording of the at least one measurement object, whether the first and/or second image capturing apparatus is maintaining a predetermined safety distance from the at least one measurement object.

9. The measuring system according to claim 1, characterized in that the evaluation apparatus is configured to check the plausibility of the depth information ascertained from the first and the second measured images, preferably pixel-by-pixel, on the basis of the calibration parameters of the first and/or second image capturing apparatus.

10. The measuring system according to claim 9, characterized in that the evaluation apparatus is configured to compare, during the plausibility check, the depth information ascertained from the first and second measured images, preferably pixel-by-pixel, with depth information that is to be expected in an ideally calibrated state of the first and/or the second image capturing apparatus on the basis of the calibration parameters of the first and/or second image capturing apparatus.

11. The measuring system according to claim 1, characterized in that the evaluation apparatus is configured to include the ascertained calibration quality in a display of at least one measurement result that is to be displayed in relation to the at least one measurement object.

12. The measuring system according to claim 1, characterized in that the output of the first and/or second alert comprises at least that at least one predetermined operating function of the measuring system is at least temporarily deactivated; and/or that an indication is effected that at least one predetermined operating function of the measuring system is at least temporarily deactivated; and/or that an indication is effected as to which type of capturing defect is present in which image segment of the first and/or second measured image; and/or that an indication is effected of how a user can remedy the ascertained capturing defect; and/or that an indication is effected of the extent to which the calibration quality for the first and/or second measured image deviates from an ideal state; and/or that an indication is effected that a calibration of the first and/or second image capturing apparatus is to be effected.

13. The measuring system according to claim 1, characterized in that the output apparatus is designed to output the first and/or second alert in optical and/or acoustic and/or haptic form.

14. The measuring system according to claim 1, which is comprised in a stereo endoscope or in a stereo exoscope or in a stereo microscope or in a stereo laryngoscope.

15. A measuring method for checking a measured-image state and/or a calibration quality for a stereo measured image, comprising the steps of:
  capturing from a first viewing angle at least one first measured image of a measurement object in a scene;
  capturing, from a second viewing angle which differs from the first viewing angle, at least one second measured image of the measurement object in the scene; and
  generating a stereo measured image from the at least first measured image and the at least second measured image by way of stereo reconstruction, wherein depth information is comprised in the stereo measured image for individual pixels of the stereo measured image;
characterized by the steps of:
  checking a measured-image state of the at least first measured image and/or the at least second measured image for the presence of at least one capturing defect; and/or checking the calibration quality for the stereo measured image on the basis of calibration parameters;
  and, should the at least one capturing defect overshoot or undershoot a predetermined threshold value,
  displaying an initial alert,
  and/or, should the calibration quality undershoot a predetermined quality limit value, displaying a second alert.

* * * * *